Aug. 15, 1939.  G. Z. VON MANTEUFFEL  2,169,982
DEVICE FOR AUTOMATICALLY CONTROLLING THE FORE
AND AFT INCLINATION OF AIRCRAFT
Filed Jan. 26, 1939
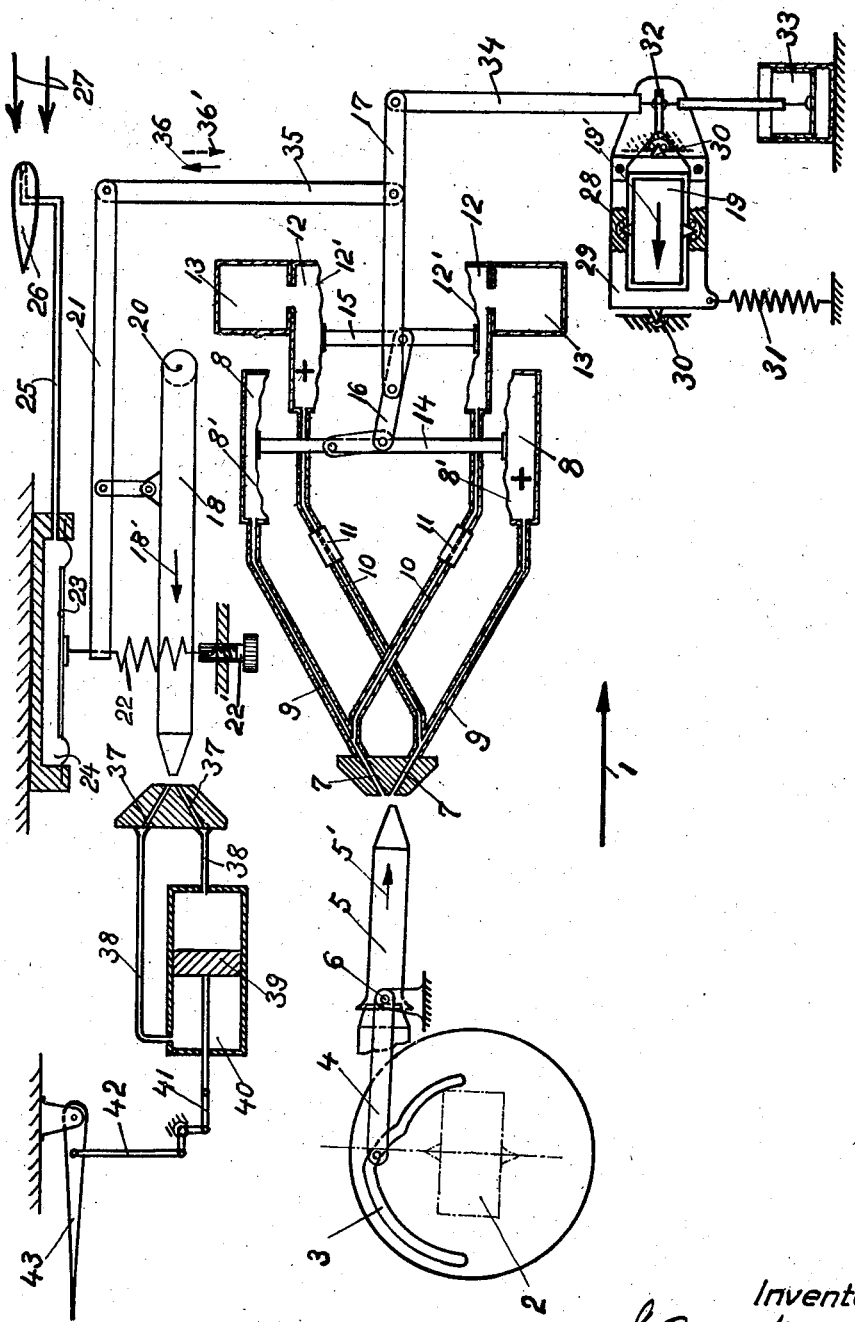
Inventor:

Patented Aug. 15, 1939

2,169,982

UNITED STATES PATENT OFFICE 2,169,982

DEVICE FOR AUTOMATICALLY CONTROLLING THE FORE AND AFT INCLINATION OF AIRCRAFT

Gert Zoege von Manteuffel, Berlin-Dahlem, Germany, assignor to Askania-Werke A. G., a corporation of Germany Application January 26, 1939, Serial No. 252,961
In Germany August 17, 1937

14 Claims. (Cl. 244—78)

The present invention is concerned with a means for the automatic control of the fore and aft inclination of aircraft.

It is an object of this invention to provide a means of this nature which is sensitive both to the air speed and the flight attitude of the aircraft.

It has previously been proposed to make the automatic control of the elevator, which control is made dependent on a fore and aft inclinometer or altimeter, additionally sensitive to an air-speed responsive device. The alleged object of such an arrangement was to ensure further to the stabilizing of the airplane the maintenance of an air speed compatible with safety of flight, should the propelling mechanism fail. This prior suggestion, however, had the disadvantage that the superimposed control values acted oppositely one to the other and thus detrimentally affected one another.

In the present invention this is avoided by the use of a delayed-action means for slowly compensating the effect of the control values serving to stabilize the longitudinal inclination of the craft. With this arrangement long-period deviations from the requisite inclination are gradually rendered ineffective and the position of the elevator is adjusted so as to maintain the speed of the aircraft.

According to a further part of the invention the controlling force acting in dependence upon the flying attitude of the craft is made to operate the fore and aft inclination regulating means (e. g. the elevator) through the medium of two measuring systems working in opposition to one another, but one of which includes time delay means so that it lags somewhat behind the other measuring system whereby the control force or movement of these measuring systems is compensated when a change of the flying speed causes a permanent tilt of the craft. This resultant force or movement is superimposed upon the control force or movement emanating from the control responsive to the speed of flight of the craft. Therefore, any change in the fore and aft inclination, or altitude, respectively, will cause a deflection of the elevator in order to restore the former position of flight, but upon disturbances of longer duration this tendency will be overcome by the speed responsive device which then gradually changes the fore and aft inclination as will be necessary to maintain the flying speed.

In accordance with a further part of this invention a jet pipe relay supplied with pressure fluid may be employed to provide the force the action of which is dependent upon the inclination of the craft, and this jet pipe can be associated with and actuated by a gyro-vertical provided for stabilizing the longitudinal inclination of the craft. The jet pipe relay would have, in the usual manner, a pair of nozzles arranged opposite to the discharge end of the jet pipe so as alternately to receive pressure fluid from the jet pipe as this oscillates. The jet pipe could, instead of the gyroscope, be controlled by any other instrument suitable to stabilize the flying attitude of the craft, as for example an altimeter.

According to a still further part of the invention the said two nozzles are arranged to communicate respectively with the two chambers of a primary differential pressure meter, the pressure fluid being delivered directly to these chambers from the nozzles; and the said nozzles also respectively have communication (constricted as compared with their communications with the chambers of the primary differential pressure meter) with the two chambers of a secondary differential pressure meter which is arranged oppositely to the primary differential meter so that the effect produced by the primary meter is opposed by the delayed effect produced by the secondary meter, and means are provided to transmit the resultant movement of the actuating members of the two meters to a secondary pressure fluid relay upon which is also impressed the controlling effect of the air speed responsive device. The delayed effect of the secondary meter results from the constriction of the communications of the said nozzles with the chambers of the meter but may be augmented providing the said chambers of the secondary meter with auxiliary capacities, as for example by providing them with auxiliary chambers.

Further aims, objects and advantages will appear from a consideration of the description, as well as the accompanying drawing showing an embodiment of the invention for illustrative purposes.

The drawing diagrammatically illustrates a vertical section through an automatic control device constructed according to the invention and in which the elevator of an aeroplane is automatically controlled by an air speed responsive member on the control valve of which there is superimposed a second control value which is self-adjusting or compensating and is supplied by a gyro-vertical.

In the annexed drawing, the arrow 1 denotes the direction of flight of the aircraft. A gyro-vertical 2 controls a jet pipe relay 5 (which is pivotable about an axis 6) through a disc having a cam slot 3 in which works the follower of a lever 4 associated with the jet pipe 5.

Pressure fluid (supplied from any suitable source) flows through the jet pipe 5, in the direction of the arrow 5', to the nozzle orifices 7. The latter are directly connected through conduits 9, 9 respectively to the two chambers of a primary differential pressure meter 8.

Cross-over conduits 10, 10, are branched off from the conduits 9, 9, and include throttling or constricted parts 11, 11. The conduits 10, 10 lead respectively to the two chambers 12 of a secondary differential pressure meter. The said two chambers 12 each have an auxiliary chamber 13 communicating therewith.

The chambers 8 of the primary differential pressure meter are each provided with a diaphragm 8' and these diaphragms are interconnected by a bar 14. The chambers 12 are similarly provided with covering diaphragms 12' which are interconnected by a bar 15.

The bars 14 and 15 are connected by a differential linkage system 16 and a lever 17 to a jet pipe relay 18 on the one hand, and to a damping gyroscope 19 on the other hand.

Pressure medium supplied from a suitable source is adapted to flow through the jet-pipe of the relay 18 in the direction of the arrow 18', and this jet pipe is arranged to oscillate about a pivot 20 under the action of a lever 21 which, in turn, is operated by a diaphragm 23 loaded by a spring 22. A set screw 22' is provided for setting the tension of the spring 22 to correspond with the desired speed of flight.

The diaphragm 23 forms the closure of a housing 24 which is connected through a pressure conduit 25 with a Pitot tube 26. The pressure set up by the relative wind acts on the tube 26 in the direction of the arrows 27.

The rotor of the damping gyroscope 19 rotates in the direction of arrow 19' about vertical pivot points 28 mounted in a prescession frame 29. The latter is adapted to oscillate about horizontally-arranged pivot points 30, the axis of which is parallel to the direction of flight of the aircraft.

Attached to the frame 29 is a frontwardly-directed lever 32 which is connected on the one hand with a dashpot piston 33, and on the other hand with a lever 34 pivotally connected to the lever 17.

The levers 17 and 21 are connected together by a link 35 which is capable of movement in the directions of the two arrows 36 and 36'.

Fluid issuing from the jet pipe 18 enters the nozzle orifices 37 and passes through conduits 38 to the two sides of a servo-motor piston 39. The latter is movable in a casing or cylinder 40 and controls the elevator 43 of the aircraft through a linkage 41, 42.

The operation of the device described is as follows.

Should the attitude of the air craft be temporarily changed for short periods, the differential pressure set up by the movements of the jet pipe relay 5 will only have a substantial effect on the diaphragms 8'. The delay in the passage of fluid to the chambers 12, 12, caused by the constrictions 11, 11 and by the provisions of these chambers with auxiliary capacities 13, is so great that short period fluctuations in pressure will not affect the diaphragms 12', 12'. Consequently the bar 15 does not change its position and only the bar 14 moves, this bar controlling the second jet pipe relay through the levers 17, 35 and 21. Pressure will then be exerted on the piston 39 in accordance with the change of attitude of the aircraft, and this will cause an adjustment of the elevator 43.

The movement of the jet pipe 18 will be additional affected by the gyroscope 19, so long as the aircraft has an angular velocity around its axis. The gyroscope 19 is responsive to angular velocities derived from changes in the fore and aft inclination of the craft when it produces a precession beat which is damped by the piston 33.

A third control value which affects the jet pipe 18 is represented by an impulse dependent on the relative wind speed of the craft. The spring 22 is so adjusted by means of the screw 22' that it balances the dynamic pressure in the housing 24 when the relative wind speed has a predetermined value. Any deviation from this speed is transformed into a movement of the diaphragm 23, and causes an adjustment of the relay 18 and a corresponding movement of the elevator.

If the speed of travel decreases or the relative wind speed otherwise varies, the pressure acting on diaphragm 23 drops and, as a result, the jet pipe 18 moves upwards and discharges a greater amount of pressure fluid into the upper orifice 37 than into the lower one. The servo-motor piston 39 then moves to the right and the elevator moves downwardly. This causes the nose of the aircraft to dip by an amount sufficient to compensate the fall in speed, due, for example, to the failure of the engine.

This adjustment of the elevator first counteracts the control value given by the jet pipe relay 5 as the result of the longitudinal inclination of the aircraft. After a short period, however, sufficient fluid passes through the appropriate constriction 11 to one meter chamber 12, whereupon the bar 15 is moved.

If the chamber systems 8 and 12 are of the same construction, the transmission lever is pivotally connected to the rod 16 at the middle of the latter. This results in the displacement of the lever 14 in relation to the transmission lever 17, ceasing after a short while due to the movement of the bar 15.

The accompanying drawing illustrates a case in which the aircraft has an excessive speed for a long period. The initial consequence is that the jet pipe relay 18, which is moved downward by the diaphragm 23, imparts an upward movement to the elevator. The aircraft will strive to right itself but will at first be prevented from doing so by the gyroscope 3 and the relay 5 controlled thereby. Thus, when the inclination of the aircraft is modified the jet pipe relay 5 comes to rest in front of the lower orifice 7, resulting in an over pressure on the lower diaphragm 8' and an upward movement of the bar 14.

The full effect of the control value which is dependent on the relative wind speed cannot come fully into play in view of the fact that the jet pipe relay 18 is also moved upwards by this action. After a short time, however, the pressure in the chamber 12 is equalized with that in the chamber 8, whereupon the bar 15 between the diaphragms 12' moves downwards in opposition to the movement of the bar 14. In this way the lever 17 is restored to its mean position, so that the full dynamical pressure in the chamber 24 acts on the jet pipe 18.

The yielding nature of the control characteristic imparted by the gyro-vertical enables the proper flight conditions to be strictly maintained at all times, and at the same time the advantage is obtained that the fore and aft inclination is used as a measure for the balance of energy in stabilizing the craft. Under suitable circumstances, an apparatus responsive to changes in altitude, e. g. a statoscope, could replace the inclinometer or gyro-vertical.

Furthermore, abrupt control movements are prevented by the added control characteristic of the damping gyroscope 19, thus further increasing the safety of the automatic control device.

It will be understood that I desire to comprehend within my invention such modifications as may be clearly embraced within the claims and scope of my invention.

What I claim is:

1. Apparatus for automatically controlling the fore and aft inclination of an aircraft, comprising a device responsive to the speed of the craft, means for varying the position of the elevator under the influence of said speed responsive device, and a device responsive to changes in the fore and aft inclination of the aircraft for additional control of said means for varying the elevator position, said inclination-responsive device including primary means for providing a primary actuation and means adapted to act with a time delay relative to said primary means for counteracting the effect of the latter.

2. Apparatus for automatic control of the fore and aft inclination of an aircraft, comprising a device for actuating the elevator of the aircraft, means responsive to changes in the air speed for operating said elevator-actuating device, control means responsive to changes in the fore and aft inclination of the aircraft for operating said elevator-actuating device in opposition to said air speed-responsive means, and delayed-action means for compensating the effect of said control means.

3. Apparatus for automatic control of the fore and aft inclination of an aircraft, comprising a device for actuating the elevator of the aircraft, means responsive to change in the air speed of the craft for imposing a control value on said elevator-actuating device, control means responsive to a flight characteristic of the aircraft for imposing a second control value on said elevator-actuating device, and delayed-action means for compensating said second control value.

4. Apparatus for automatic control of the fore and aft inclination of an aircraft, comprising a device for actuating the elevator of the aircraft, means responsive to changes in the air speed for operating said elevator-actuating device, control means responsive to changes in the attitude of the aircraft for operating said elevator-actuating device in opposition to said air speed-responsive means, and delayed-action means for compensating the effect of said control means.

5. Apparatus for automatic control of the fore and aft inclination of an aircraft, comprising a device for actuating the elevator of the aircraft, means responsive to changes in the air speed for operating said elevator-actuating device, and control means responsive to changes in the inclination of the aircraft for operating said elevator-actuating device in opposition to said air speed-responsive means, said control means comprising a first meter adapted for direct operation in response to a change in the inclination of the aircraft, a second meter adapted for delayed operation in response to said change in inclination, and means for balancing the operation of said first and second meters.

6. Apparatus for automatic control of the fore and aft inclination of an aircraft, comprising a device for actuating the elevator of the aircraft, means responsive to changes in the air speed for operating said elevator-actuating device, and control means responsive to changes in the inclination of the aircraft for operating said elevator-actuating device in opposition to said air speed-responsive means, said control means comprising a first meter adapted for direct operation in response to a change in the inclination of the aircraft, a second meter adapted for delayed operation in response to said change in inclination, means for balancing the operation of said first and second meters, a jet pipe relay for supplying working fluid in variable relative amounts to said first and second meters, and means for pivoting said jet pipe relay in accordance with changes in the inclination of the aircraft.

7. Apparatus for automatic control of the fore and aft inclination of an aircraft, comprising a device for actuating the elevator of the aircraft, means responsive to changes in the air speed for operating said elevator-actuating device, and control means responsive to changes in the inclination of the aircraft for operating said elevator-actuating device in opposition to said air speed-responsive means, said control means comprising balanced devices adapted respectively for rapid and delayed response to a change in inclination of the aircraft, a gyroscope adapted to be controlled by changes in said inclination, and a jet pipe relay adapted to be operated by said gyroscope so as to actuate said balanced devices.

8. Apparatus for automatic control of the fore and aft inclination of an aircraft, comprising a device for actuating the elevator of the aircraft, means responsive to changes in the air speed for operating said elevator-actuating device, and control means responsive to changes in the inclination of the aircraft for operating said elevator-actuating device in opposition to said air speed-responsive means, said control means comprising a jet pipe relay adapted to be moved when changes occur in the inclination of the aircraft, two pairs of oppositely-located chambers each having a deformable wall, the deformable walls of each pair of chambers being interconnected by rigid means, branched conduits for leading fluid from said jet pipe to said chambers, means for retarding the action of fluid on the deformable walls of each of one pair of oppositely-located chambers, and a linkage from transmitting movements of said rigid means to said elevator-actuating device.

9. Apparatus according to claim 8, wherein the said means for retarding the action of fluid on the deformable walls comprise adjustable constrictions in the conduits leading to each of one of said pairs of oppositely-located chambers.

10. Apparatus according to claim 8, wherein the means for retarding the action of fluid on the deformable walls comprise an auxiliary chamber communicating with each chamber of one pair of oppositely-located chambers.

11. Apparatus for controlling automatically the fore and aft inclination of an aircraft, comprising a servo-motor, a relay for supplying pressure fluid to either side of the piston of said servo-motor, a pair of oppositely-acting control members, linkage means for transmitting the resultant of the actions of said control member to said relay, means operable by pressure fluid for each of said control members, conduit means for leading pressure fluid to each of said fluid pressure operable means, relay means for supplying pressure fluid to said conduits, means responsive to a flight characteristic of the aircraft for controlling said relay, and means for delaying the action of one of said pressure-operable means.

12. Apparatus for automatic control of the fore and aft inclination of an aircraft, comprising a servo-motor with its piston operatively connected to the elevator of the aircraft, a jet pipe relay for controlling the operation of said servo-motor, means responsive to changes in the air speed of the aircraft for controlling the jet pipe of said jet pipe relay and means responsive to changes in the fore and aft inclination of the aircraft for imposing a second control on said jet pipe in opposition to the air-speed responsive control.

13. Apparatus for automatic control of the fore and aft inclination of an aircraft, comprising a servo-motor having its piston operatively connected to the elevator of the aircraft, a jet pipe relay for controlling the operation of said servo-motor, a Pitot tube, a chamber having a diaphragm forming a wall thereof communicating with said Pitot tube, a mechanical connection between said diaphragm and the jet pipe of said jet pipe relay, adjustable means for controlling the displacement of said diaphragm, means responsive to changes in the fore and aft inclination of the aircraft for operating said jet pipe in opposition to said diaphragm, and means for delaying the action of said inclination-responsive means on the jet pipe.

14. Apparatus for automatic control of the fore and aft inclination of an aircraft, comprising means for operating the elevator of the aircraft in response to changes in the air speed of the latter, a device for operating said elevator in opposition to said air-speed responsive means, time delay means for controlling said device, and a turn gyroscope for imposing a third control on said elevator in response to rotation about the transverse axis of the aircraft.

GERT ZOEGE VON MANTEUFFEL.